(12) United States Patent
Rodriques et al.

(10) Patent No.: US 10,146,633 B2
(45) Date of Patent: *Dec. 4, 2018

(54) DATA RECOVERY FROM MULTIPLE DATA BACKUP TECHNOLOGIES

(71) Applicant: EMC IP Holding Company LLC, Hopkinton, MA (US)

(72) Inventors: Manuel Rodriques, Sutton, MA (US); John Rokicki, Rutland, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/582,335

(22) Filed: Apr. 28, 2017

(65) Prior Publication Data
US 2017/0235643 A1 Aug. 17, 2017

Related U.S. Application Data

(63) Continuation of application No. 14/225,036, filed on Mar. 25, 2014, now Pat. No. 9,672,113.

(51) Int. Cl.
*G06F 11/14* (2006.01)
*G06F 3/06* (2006.01)

(52) U.S. Cl.
CPC ...... *G06F 11/1451* (2013.01); *G06F 11/1448* (2013.01); *G06F 11/1453* (2013.01); *G06F 11/1456* (2013.01); *G06F 11/1458* (2013.01); *G06F 11/1461* (2013.01); *G06F 11/1469* (2013.01); *G06F 3/0685* (2013.01); *G06F 2201/84* (2013.01)

(58) Field of Classification Search
CPC ............. G06F 11/1448; G06F 11/1453; G06F 11/1458; G06F 11/1461; G06F 11/1469; G06F 3/06; G06F 3/0685; G06F 3/0686; G06F 3/0641; G06F 3/065
See application file for complete search history.

(56) References Cited

U.S. PATENT DOCUMENTS

| | | |
|---|---|---|
| 8,131,681 B1 | 3/2012 | Hangud |
| 8,200,926 B1 | 6/2012 | Stringham |
| 9,063,898 B1 | 6/2015 | Merchant |
| 2004/0163009 A1 | 8/2004 | Goldstein |
| 2004/0250033 A1 | 12/2004 | Prahlad |
| 2009/0177718 A1 | 7/2009 | Patterson |
| 2011/0167221 A1 | 7/2011 | Pangal |
| 2013/0282999 A1 | 10/2013 | Bennett |

*Primary Examiner* — Ann J Lo
*Assistant Examiner* — Masud K Khan
(74) *Attorney, Agent, or Firm* — Van Pelt, Yi & James LLP

(57) ABSTRACT

A backup system comprises a tape backup storage storing a set of tape backup data, a snapshot backup storage storing a nearest snapshot, and a processor. The processor is configured to determine the nearest snapshot, wherein a snapshot time of the nearest snapshot is nearest in time to a backup time, and determine the set of tape backup data, wherein the set of tape backup data and the nearest snapshot enable recovery of a backup data.

20 Claims, 8 Drawing Sheets

| Time | Current Block List | Blocks Backed Up | Snapshot Created |
|---|---|---|---|
| T1 | 1, 2, 3, 4, 5 | 1, 2, 3, 4, 5 | No |
| T2 | 1A, 2, 3A, 4, 5A | 1A, 3A, 5A | No |
| T3 | 1A, 2A, 3A, 4A, 5A | 2A, 4A | No |
| T4 | 1B, 2A, 3A, 4A, 5A | 1B | No |
| T5 | 1B, 2A, 3A, 4B, 5A | 4B | Yes |
| T6 | 1C, 2A, 3A, 4B, 5A | 1C | No |
| T7 | 1C, 2B, 3A, 4B, 5A | 2B | No |

Fig. 4

DATA RECOVERY FROM MULTIPLE DATA BACKUP TECHNOLOGIES

CROSS REFERENCE TO OTHER APPLICATIONS

This application is a continuation of co-pending U.S. patent application Ser. No. 14/225,036 entitled DATA RECOVERY FROM MULTIPLE DATA BACKUP TECHNOLOGIES filed Mar. 25, 2014 which is incorporated herein by reference for all purposes.

BACKGROUND OF THE INVENTION

Different backup technologies provide different quality of service metrics such as cost, recovery time, and overall performance. Storage array-based disk snapshots provide high performance and low recovery time, but at a high cost. Each storage array technology has a range of costs relative to the types of snapshots, with full clones being the most costly and space efficient snapshots being the least, though all of them more costly than other technologies such as tape or virtual tape. Incremental backups provide low to moderate performance and low cost, but higher recovery time depending on the data set to be recovered.

BRIEF DESCRIPTION OF THE DRAWINGS

Various embodiments of the invention are disclosed in the following detailed description and the accompanying drawings.

FIG. 4 is a diagram illustrating an embodiment of an example of data recovery from multiple data backup technologies.

DETAILED DESCRIPTION

Figure 1:
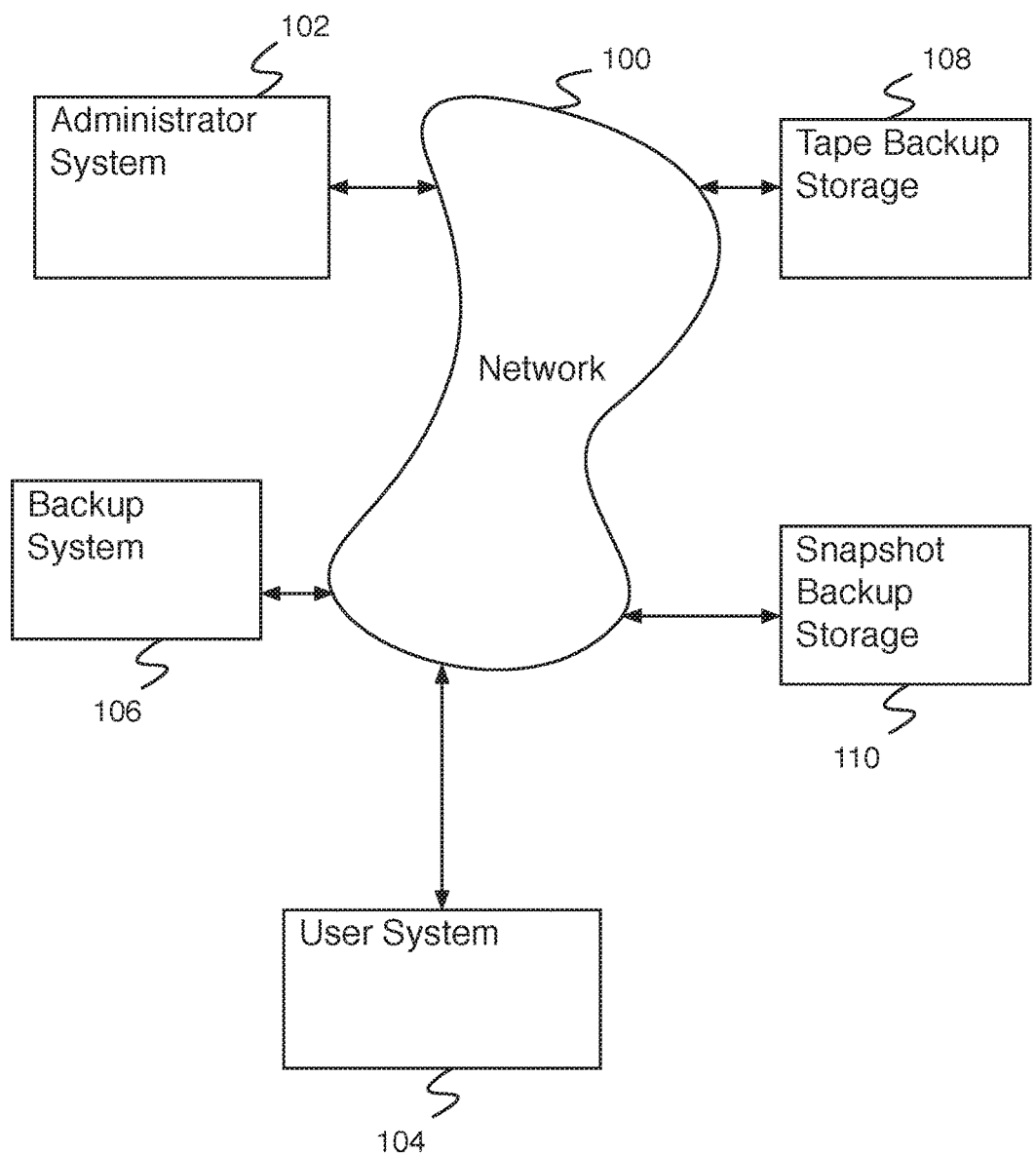
FIG. 1 is a block diagram illustrating an embodiment of a network system for backup storage.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A process for data recovery from multiple data backup technologies is disclosed. A backup system comprises a tape backup storage, a snapshot backup storage, and a processor configured to determine a nearest snapshot, wherein a snapshot time of the nearest snapshot is nearest in time to the backup time, and determine a set of tape backup data, wherein the set of tape backup data and the nearest snapshot enable recovery of the backup data. The backup system additionally comprises a memory coupled to the processor and configured to provide the processor with instructions.

In some embodiments, a backup system comprises a tape backup storage for storing incremental backup data and a snapshot backup storage for storage snapshot backup data. By using a storage array snapshot as the recovery media, but applying incremental backup recoveries to it, one can take advantage of the best of each technology. A smaller number of snapshots can be retained, lowering the cost by using tape. High performance and low recovery time is also maintained by using storage array disks and snapshots. Backup snapshots and incremental backups are taken on a regular basis, but only a minimal number of snapshots (e.g., one per day) are retained. A large number of incremental backups are retained on the tape backup storage. A data recovery is performed by first retrieving the nearest snapshot to the desired recovery time. Incremental backups from the tape backup storage are then used to step from the snapshot backup to the desired recovery time. In the event the nearest snapshot occurs after the desired recovery time, incremental backups are used to identify which blocks have changed between the desired recovery time and the snapshot backup, and the correct versions of the changed blocks are retrieved from incremental backups taken before the desired recovery time. The snapshot comprises the bulk of the data of the recovery, minimizing the amount of data needed to be retrieved from the slower tape backup system.

FIG. 1 is a block diagram illustrating an embodiment of a network system for backup storage. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Administrator system 102, user system 104, backup system 106, tape backup storage 108, and snapshot backup storage 110 communicate with one another via network 100. In various embodiments, administrator system 102, user system 104, backup system 106, tape backup storage 108, and snapshot backup storage 110 and subsets thereof are in physical proximity to one another (e.g., in the same building, in the same room, etc.) or are physically remote from one another (e.g., in separate buildings of a campus, in separate locations of a business, at separate offices of a collaboration between organizations, in separate countries, etc.). In various embodiments, the processors comprising administrator system 102, user system 104, backup system 106, tape backup storage 108, and snapshot backup storage 110 comprise any one of a variety of proprietary or commercially available single or multi-processor systems (e.g., an Intel-based processor) or other type of commercially available processor able to support communications in accordance with each particular embodiment and application. User system 104 comprises a system accessed by a user for using networked software (e.g., enterprise software, database software, engineering software, etc.). In some embodiments, user system 104 comprises storage for storing software data. In some embodiments, user system 104 comprises an originating system (e.g., a system providing original data that is to be backed up by a backup system). In various embodiments, the network system of FIG. 1 comprises 2, 5, 12, 58, 349, or any other appropriate number of user systems. Administrator system 102 comprises a system accessed by an administrator for administrating the network system of FIG. 1. In various embodiments, administrating the network system comprises configuring application software, configuring backup software, administering backup recovery operations, or any other appropriate administrator action. Backup system 106 comprises a system for performing backup and recovery operations. In some embodiments, backup system 106 coordinates backup of user system data (e.g., data stored on user system 104). In some embodiments, backup system 106 receives commands (e.g., backup configuration commands, backup execution commands, backup recover commands, etc.) from administrator system 102. In some embodiments, backup system 106 stores data on tape backup storage 108 and snapshot backup storage 110. Tape backup storage 108 comprises a storage system for storing backup data on tape. In some embodiments, tape backup storage 108 comprises a slow, high capacity storage system. In some embodiments, tape backup storage 108 is used to store incremental backup files. Snapshot backup storage 110 comprises a backup storage for storing snapshot backup data. In some embodiments, snapshot backup storage 110 comprises a backup system with fast access (e.g., compared to tape backup storage 108, e.g., a hard drive based backup storage system, a solid-state backup storage system, etc.). In some embodiments, snapshot backup storage 110 stores online backups (e.g., backups that can be accessed immediately, e.g., without having to load a tape, turn on a system, request data from an off-site backup system, etc.). In various embodiments, snapshot backup storage 110 comprises a disk based backup storage system, a random access memory based storage system, a deduplicated storage system, or any other appropriate kind of storage system. In some embodiments, snapshot backup data comprises a full backup. In some embodiments, snapshot backup data comprises a representation of a full backup (e.g., a set of pointers to data chunks comprising a full backup).

Figure 2:
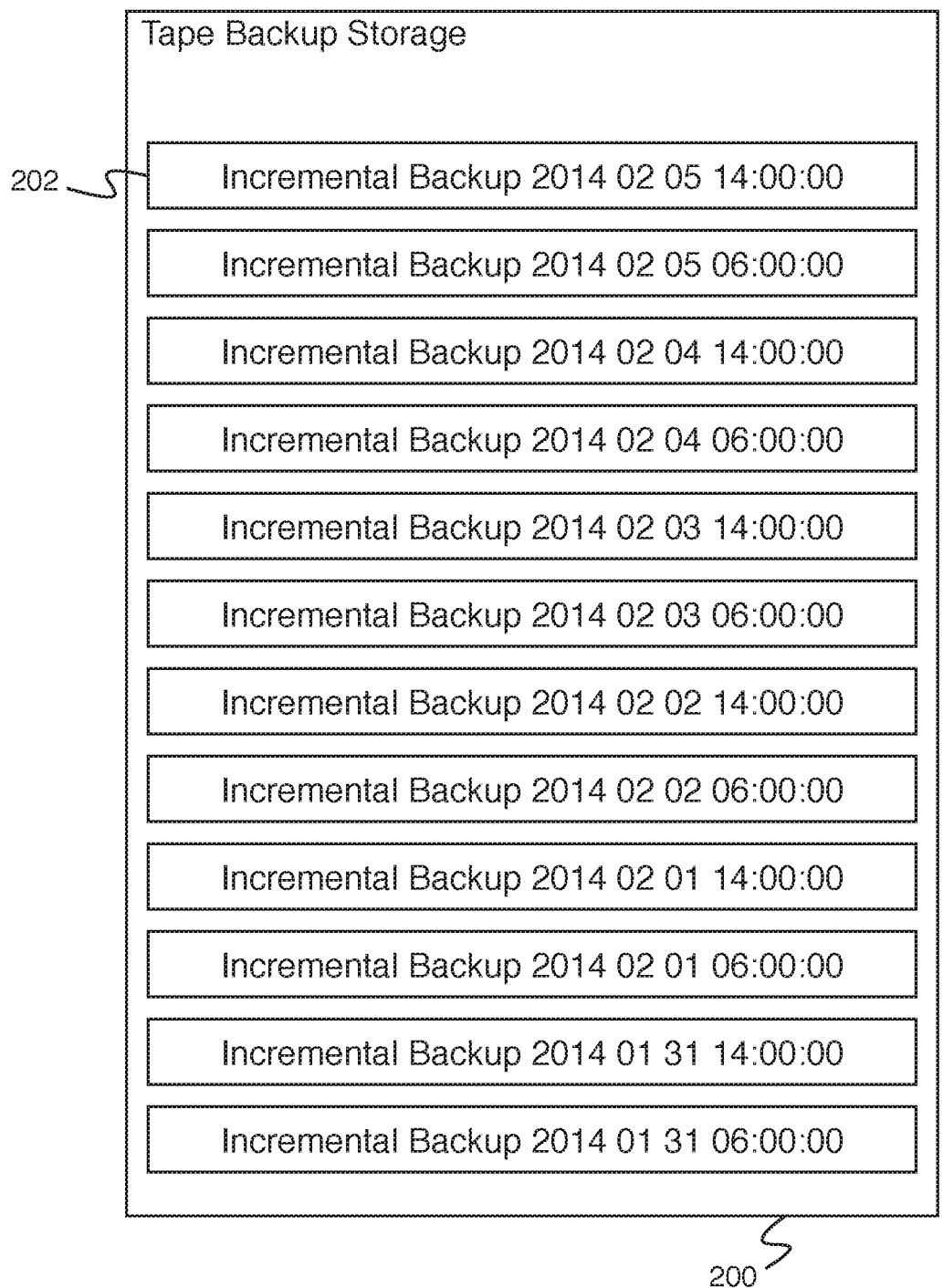
FIG. 2 is a diagram illustrating an embodiment of a tape backup storage.

FIG. 2 is a diagram illustrating an embodiment of a tape backup storage. In some embodiments, tape backup storage 200 comprises tape backup storage 108 of FIG. 1. In the example shown, tape backup storage 200 comprises a plurality of incremental backups (e.g., incremental backup 202). Incremental backups are recorded twice a day (e.g., at 06:00:00 and at 14:00:00). In various embodiments, incremental backups are recorded once a day, twice a day, twelve times a day, one hundred times a day, or at any other appropriate rate. In some embodiments, one or more incremental backups are combined with a full backup or a snapshot to recover data from a desired time. In some embodiments, the first incremental backup comprises a full backup.

Figure 3:
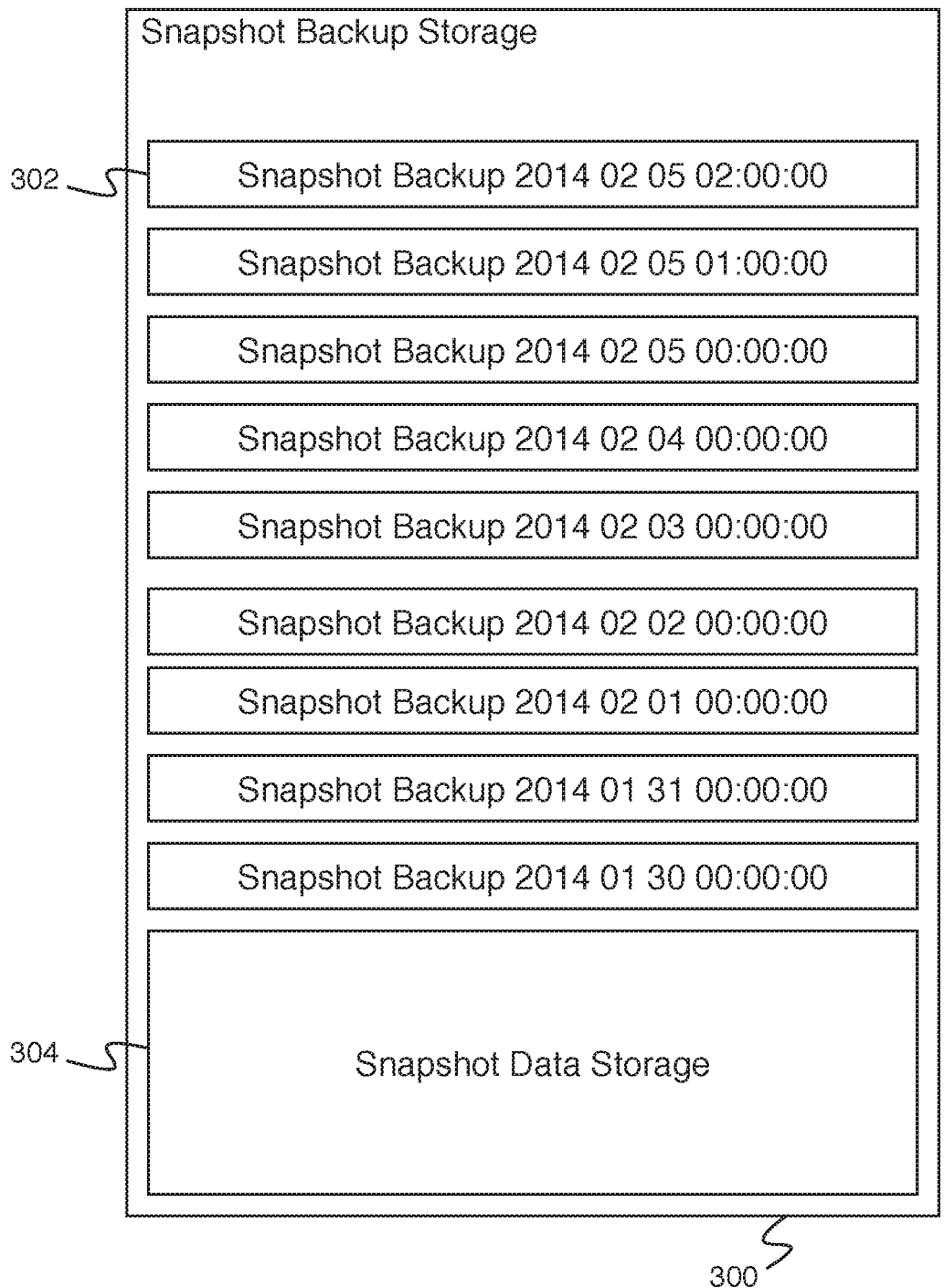
FIG. 3 is a diagram illustrating an embodiment of a snapshot backup storage.

FIG. 3 is a diagram illustrating an embodiment of a snapshot backup storage. In some embodiments, snapshot backup storage 300 comprises snapshot backup storage 110 of FIG. 1. In the example shown, snapshot backup storage 300 comprises a plurality of snapshot backups (e.g., snapshot backup 302). Snapshot backups are recorded once an hour (e.g., on the hour), and at the end of each day, a subset of the snapshot backups are deleted such that only one snapshot backup for the day is retained (e.g., the backup taken at midnight as the day starts, e.g., 00:00:00). In various embodiments, snapshot backup are recorded once an hour, twice an hour, three times an hour, once every two hours, once every three hours, or at any other appropriate rate. In various embodiments, one snapshot each day is retained, two snapshots per day are retained, six snapshots per day are retained, or any other appropriate number of snapshots per day are retained. In the example shown, snapshot backup storage 300 additionally comprises snapshot data storage 304. In some embodiments, each snapshot backup comprises a set of data block identifiers. The data blocks associated with the data block identifiers can be assembled to form a full backup (e.g., a complete copy of the data on the originating system at the time of the snapshot backup). Data blocks associated with the data block identifiers are stored in snapshot data storage 304.

FIG. 4 is a diagram illustrating an embodiment of an example of data recovery from multiple data backup technologies. In the example shown, backups of an originating system comprising five blocks (e.g., blocks 1, 2, 3, 4, and 5) are taken at seven distinct points in time (e.g., T1, T2, T3, T4, T5, T6, T7). In the example shown, at T1, the originating system comprises blocks 1, 2, 3, 4, and 5. When the backup is created, blocks 1, 2, 3, 4, and 5 are backed up (e.g., to an incremental backup stored in a tape backup storage). When the backup is created, it is determined that it is not time to create a snapshot, and a snapshot is not created. At T2, the originating system comprises blocks 1A, 2, 3A, 4, and 5A. When the backup is created, blocks 1A, 3A, and 5A are backed up (e.g., to an incremental backup stored in a tape backup storage). When the backup is created, it is determined that it is not time to create a snapshot, and a snapshot is not created. At T3, the originating system comprises blocks 1A, 2A, 3A, 4A, and 5A. When the backup is created, blocks 2A, and 4A are backed up (e.g., to an incremental backup stored in a tape backup storage). When the backup is created, it is determined that it is not time to create a snapshot, and a snapshot is not created. At T4, the originating system comprises blocks 1B, 2A, 3A, 4A, and 5A. When the backup is created, block 1B is backed up (e.g., to an incremental backup stored in a tape backup storage). When the backup is created, it is determined that it is not time to create a snapshot, and a snapshot is not created. At T5, the originating system comprises blocks 1B, 2A, 3A, 4B, and 5A. When the backup is created, block 1B is backed up (e.g., to an incremental backup stored in a tape backup storage). When the backup is created, it is determined that it is time to create a snapshot, and a snapshot is created (e.g., and stored to a snapshot backup storage). In some embodiments, storing the snapshot comprises storing all blocks comprising the snapshot to the snapshot data storage that are not already in the snapshot data storage. At T6, the originating system comprises blocks 1C, 2A, 3A, 4B, and 5A. When the backup is created, block 1C is backed up (e.g., to an incremental backup stored in a tape backup storage). When the backup is created, it is determined that it is not time to create a snapshot, and a snapshot is not created. At T7, the originating system comprises blocks 1C, 2B, 3A, 4B, and 5A. When the backup is created, block 2B is backed up (e.g., to an incremental backup stored in a tape backup storage). When the backup is created, it is determined that it is not time to create a snapshot, and a snapshot is not created.

In some embodiments, it is desired to recover data reflecting the state of the originating system at time T6. Recovering data to the state at time T6 comprises first recovering the nearest snapshot backup (e.g., the snapshot backup created at time T5). In some embodiments, recovering the snapshot backup comprises assembling data blocks associated with the snapshot backup from the snapshot data storage. The snapshot backup created at time T5 comprises data blocks 1B, 2A, 3A, 4B, and 5A. The set of incremental backups from the snapshot backup to the desired backup are then selected (e.g., the incremental backup created at time T6). The changes to the data blocks recorded in the incremental backup created at time T6 (e.g., block 1C replaces block 1B) are applied to the recovered snapshot backup to create the state of the originating system at time T6 (e.g., 1C, 2A, 3A, 4B, 5A). In some embodiments, data blocks comprising the recovered snapshot are not assembled from the snapshot data storage until after changes from incremental backups are applied (e.g., in order to avoid recovering data from the snapshot data storage that is not part of the originating system at the desired time).

In some embodiments, it is desired to recover data reflecting the state of the originating system at time T3. Recovering data to the state at time T3 comprises first recovering the nearest snapshot backup (e.g., the snapshot backup created at time T5). The snapshot backup created at time T5 comprises data blocks 1B, 2A, 3A, 4B, and 5A. The set of incremental backups from the snapshot backup to the desired backup are then selected (e.g., incremental backups created at times T5 and T4). In the example shown, the incremental backups move backwards in time towards the desired recovery time, so the changes recorded in the incremental backups need to be undone. The incremental backup at time T5 indicates that block 4B replaced a previous block at position 4, and the incremental backup at time T4 indicates that block 1B replaced a previous block at position 1. The previous blocks can be determined by continuing to scan the previous incremental backups until a previous change has been found. The previous change to position 4 (e.g., block 4A) is found in the incremental backup created at time T3, and the previous change to position 1 (e.g., block 1A) is found in the incremental backup created at time T2.

Figure 5:
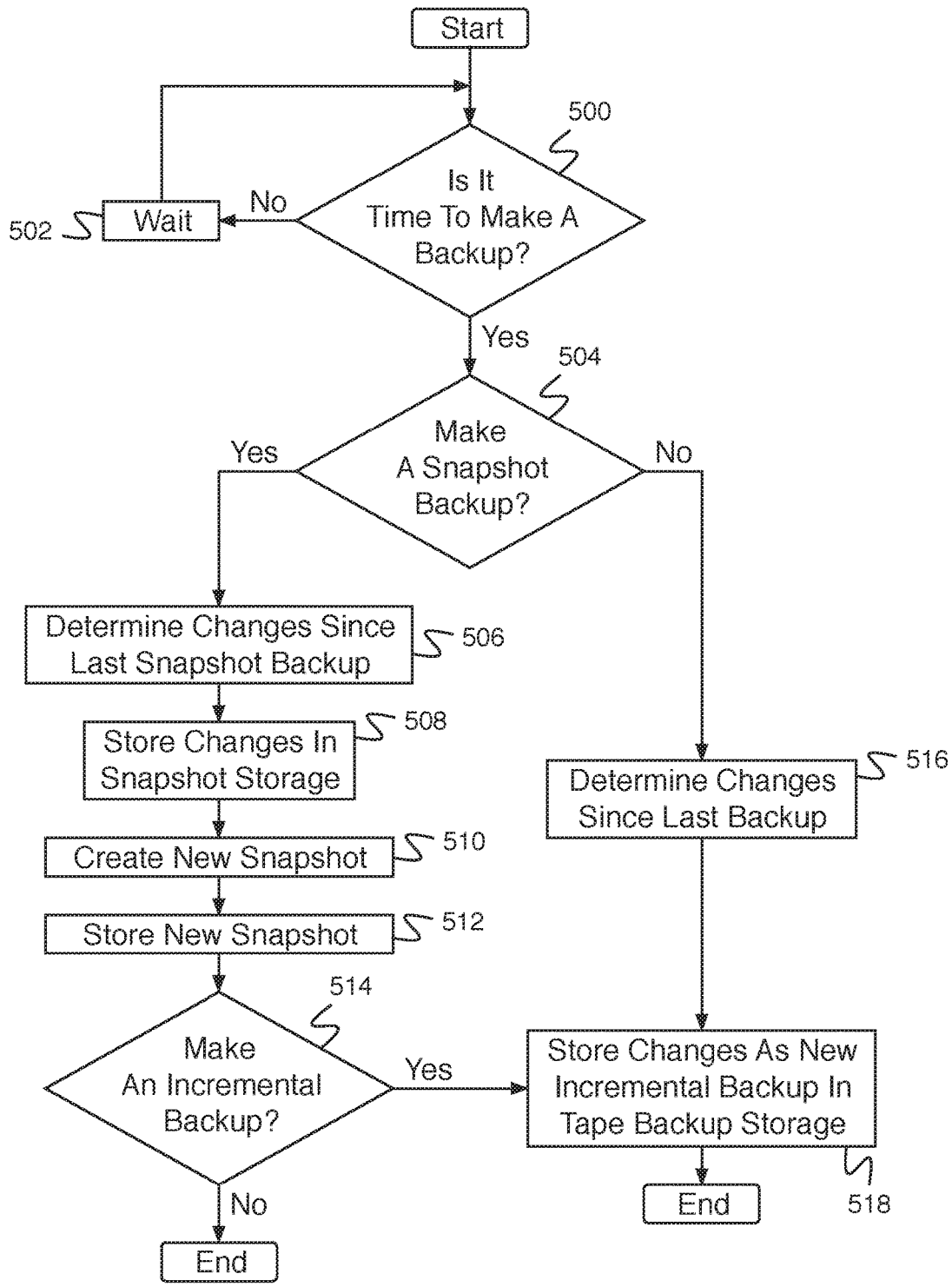
FIG. 5 is a flow diagram illustrating an embodiment of a process for making a backup.

FIG. 5 is a flow diagram illustrating an embodiment of a process for making a backup. In some embodiments, the process of FIG. 5 is executed by a backup system (e.g., backup system 106 of FIG. 1) interacting with a user system (e.g. a system originating a backup), a tape backup storage, and a snapshot backup storage. In the example shown, in 500, it is determined whether it is time to make a backup. In various embodiments, it is time to make a backup every hour, every half hour, every twenty minutes, every five minutes, or at any other appropriate rate. In the event it is determined that it is not time to make a backup, control passes to 502. In 502, the process waits. In various embodiments, the process waits 1 second, 30 seconds, 1 minute, 5 minutes, or any other appropriate period of time. Control then passes to 500. If it is determined in 500 that it is time to make a backup, control passes to 504. In 504, it is determined whether a snapshot backup should be made. In various embodiments, snapshot backups are made every other backup, every third backup, twice a day, six times a day, or at any other appropriate rate. In the event it is determined that a snapshot backup should be made, control passes to 506. In 506, changes since the last snapshot backup are determined. In some embodiments, determining changes since the last backup comprises comparing blocks on an originating system (e.g., on a user system) to blocks stored in a last backup. In 508, changes are stored in snapshot storage. In some embodiments, blocks determined to have changed are stored in the snapshot storage. In some embodiments, the snapshot storage is checked to determine whether the changed blocks are already stored, and any changed blocks not already stored are stored. In 510, a new snapshot is created. In some embodiments, a snapshot comprises a set of identifiers to data blocks stored in snapshot storage. In 512, the snapshot is stored. In 514, it is determined whether to make an incremental backup. In some embodiments, an incremental backup is made every time a snapshot backup is made. In some embodiments, an incremental backup is made only some of the time a snapshot backup is made (e.g., on any appropriate schedule). In the event it is determined to make an incremental backup, control passes to 518. In the event it is determined not to make an incremental backup, the process ends.

If it is determined in 504 that a snapshot backup should not be made, control passes to 516. In 516, changes since the last backup are determined. In 518 changes (e.g., changes determined in 506 or in 516) are stored as a new incremental backup in a tape backup storage.

Figure 6:
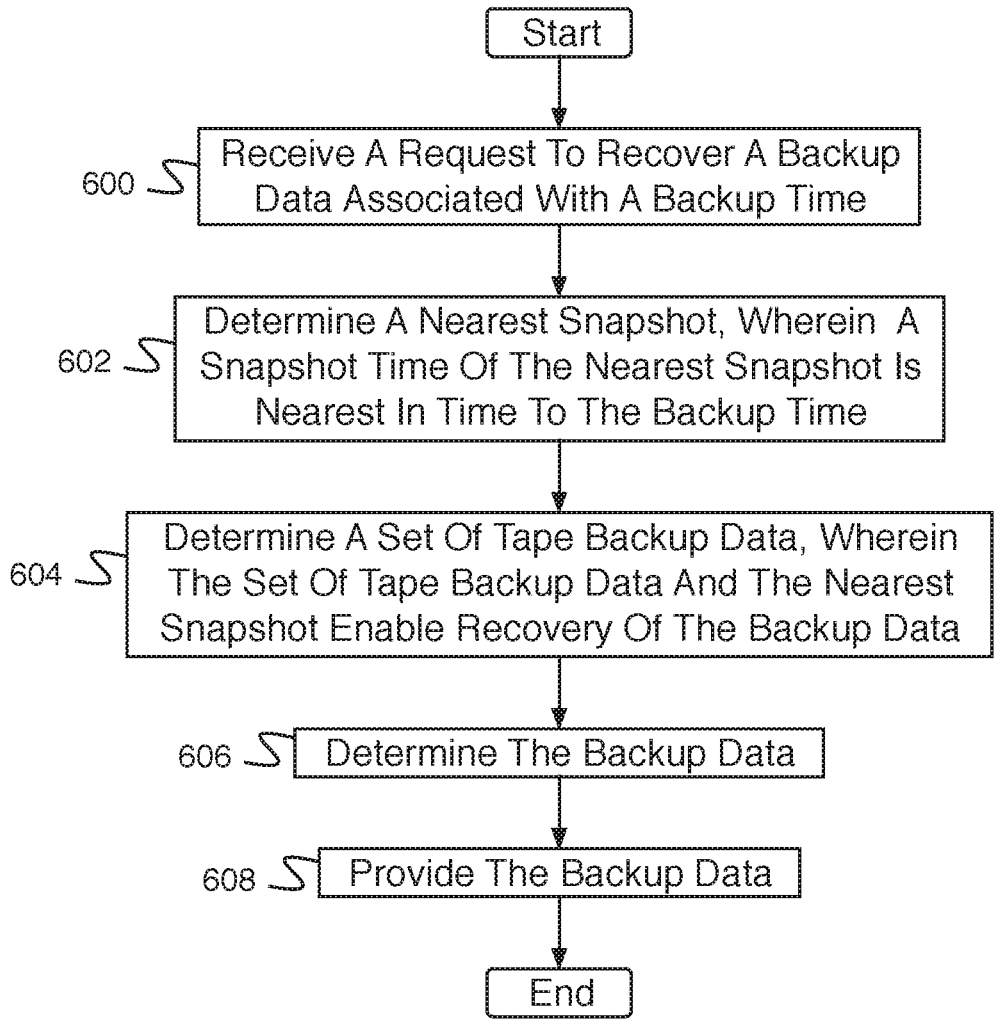
FIG. 6 is a flow diagram illustrating an embodiment of a process for recovering data from multiple data backup technologies.

FIG. 6 is a flow diagram illustrating an embodiment of a process for recovering data from multiple data backup technologies. In some embodiments, the process of FIG. 6 is executed by a backup system (e.g., backup system 106 of FIG. 1). In the example shown, in 600, a request is received to recover a backup data associated with a backup time. In some embodiments, recovering a backup data comprises restoring a system to its state at the backup time. In some embodiments, recovering a backup data comprises recovering a version of a data file from the backup time. In 602, a nearest snapshot is determined, wherein a snapshot time of the nearest snapshot is nearest in time to the backup time. In some embodiments, the nearest snapshot is determined by reading a set of snapshots (or, e.g., metadata describing a set of snapshots) and determining the snapshot with snapshot time nearest in time to the backup time. In some embodiments, the nearest snapshot time can be either before or after the backup time. In 604, a set of tape backup data is determined, wherein the set of tape backup data and the nearest snapshot enable recovery of the backup data. In some embodiments, in the event that the snapshot time of the nearest snapshot is before the backup time, the set of tape backup data comprises the set of incremental backups after the nearest snapshot time, up to and including the backup time. In some embodiments, in the event that the snapshot time of the nearest snapshot is after the backup time, the set of tape backup data comprises the set of incremental backups after the backup time, up to and including the nearest snapshot time. In some embodiments, the set of tape backup data additionally comprises one or more incremental backups prior to or including the backup time determined to comprise data blocks that are part of the backup data. In 606, the backup data is determined. In some embodiments, determining a backup data comprises reconstructing a version of a system associated with the backup time. In some embodiments, determining a backup data comprises extracting a desired file from the version of the system associated with the backup time. In 608, the backup data is provided.

Figure 7:
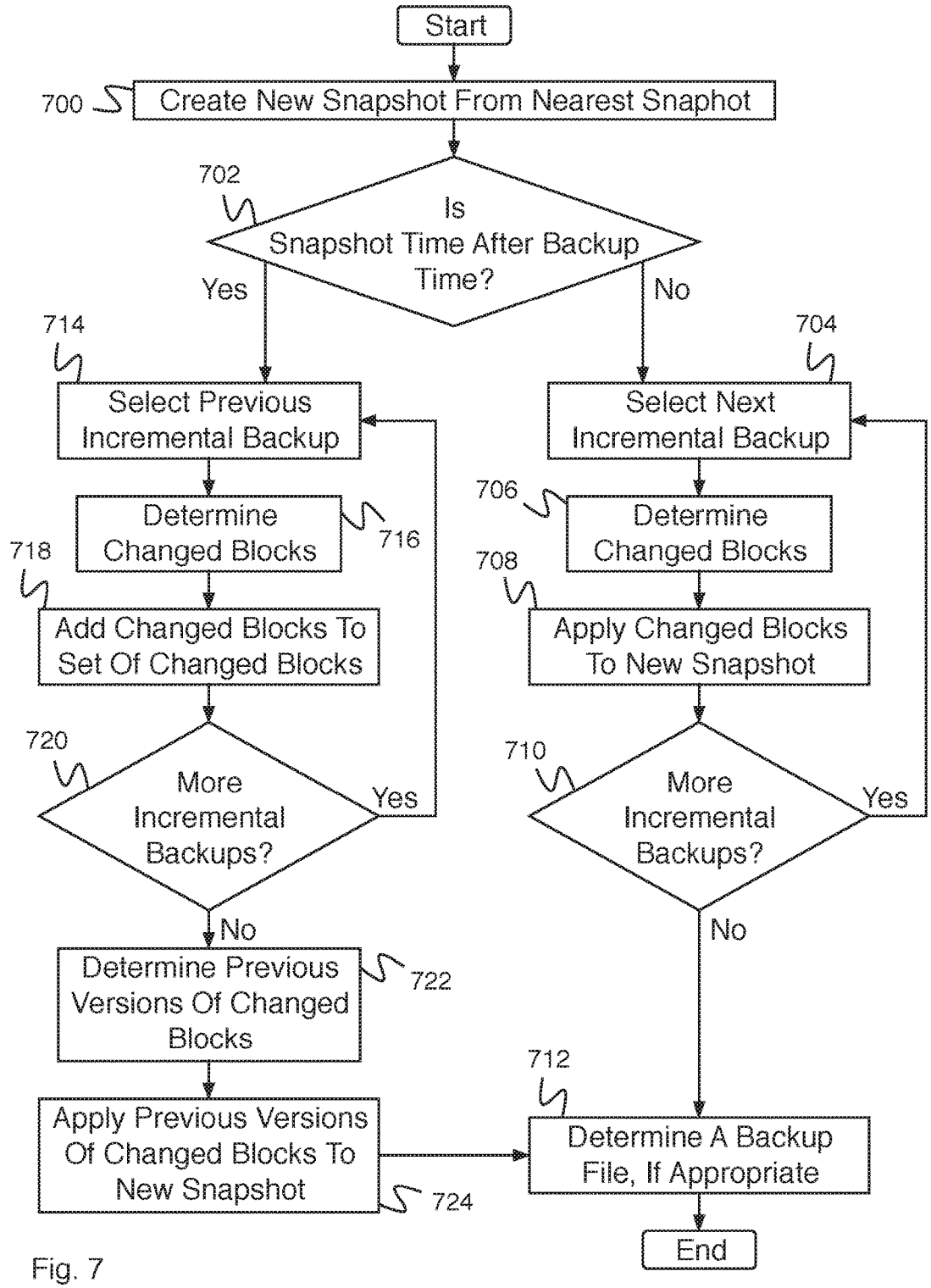
FIG. 7 is a flow diagram illustrating an embodiment of a process for determining backup data.

FIG. 7 is a flow diagram illustrating an embodiment of a process for determining backup data. In some embodiments, the process of FIG. 7 implements 606 of FIG. 6. In the example shown, in 700, a new snapshot is created from the nearest snapshot (e.g., a copy of the snapshot is made). In 702, it is determined whether the snapshot time is after the backup time. If the snapshot time is not after the backup time, control passes to 704. In 704, the next incremental backup is selected. In some embodiments, the next incremental backup comprises the first incremental backup (e.g., the first incremental backup of the set of tape backup data determined in 604, e.g., the first incremental backup after the snapshot time). In 706, changed blocks are determined. In some embodiments, changed blocks comprise blocks recorded as having been changed in the selected incremental backup. In 708, the changed blocks are applied to the new snapshot. In some embodiments, applying the changed blocks to the new snapshot comprises making the changes indicated in the selected incremental backup to the snapshot. In some embodiments, applying the changed blocks to the new snapshot comprises replacing an indicator to a block in the snapshot with an indicator to a different block. In 710, it is determined whether there are more incremental backups. If it is determined that there are more incremental backups, control passes to 704. If it is determined that there are not more incremental backups, control passes to 712.

If it is determined in 702 that the snapshot time is not after the backup time, control passes to 714. In 714, the previous incremental backup is selected. In some embodiments, the previous incremental backup comprises the last incremental backup (e.g., the last incremental backup of the set of incremental backups determined in 604, e.g., the incremental backup at or immediately before the snapshot time). In 716, changed blocks are determined. In 718, the changed blocks are added to the set of changed blocks. In some embodiments, the set of changed blocks comprises a set of indications of which blocks in the snapshot have changed before the nearest snapshot and after the backup time. In 720, it is determined whether there are more incremental backups. If it is determined that there are more incremental backups, control passes to 714. If it is determined that there are not more incremental backups, control passes to 722. In 722, previous versions of changed blocks are determined (e.g., for each block indicated as changed in the set of changed blocks, the last version of it stored before the backup time is determined). In 724, the previous versions of the changed blocks are applied to the snapshot (e.g., blocks in the snapshot determined to have been changed before the snapshot time and after the backup time are replaced with the previous versions determined in 722). Control then passes to 712. In 712, a backup file is determined, if appropriate. In some embodiments, if the user or administrator requesting the backup has requested recovery of a particular backup file, the file is determined from the new snapshot.

In some embodiments, the backup time is the same time as a snapshot. The backup files can then be taken from the snap shot directly.

Figure 8:
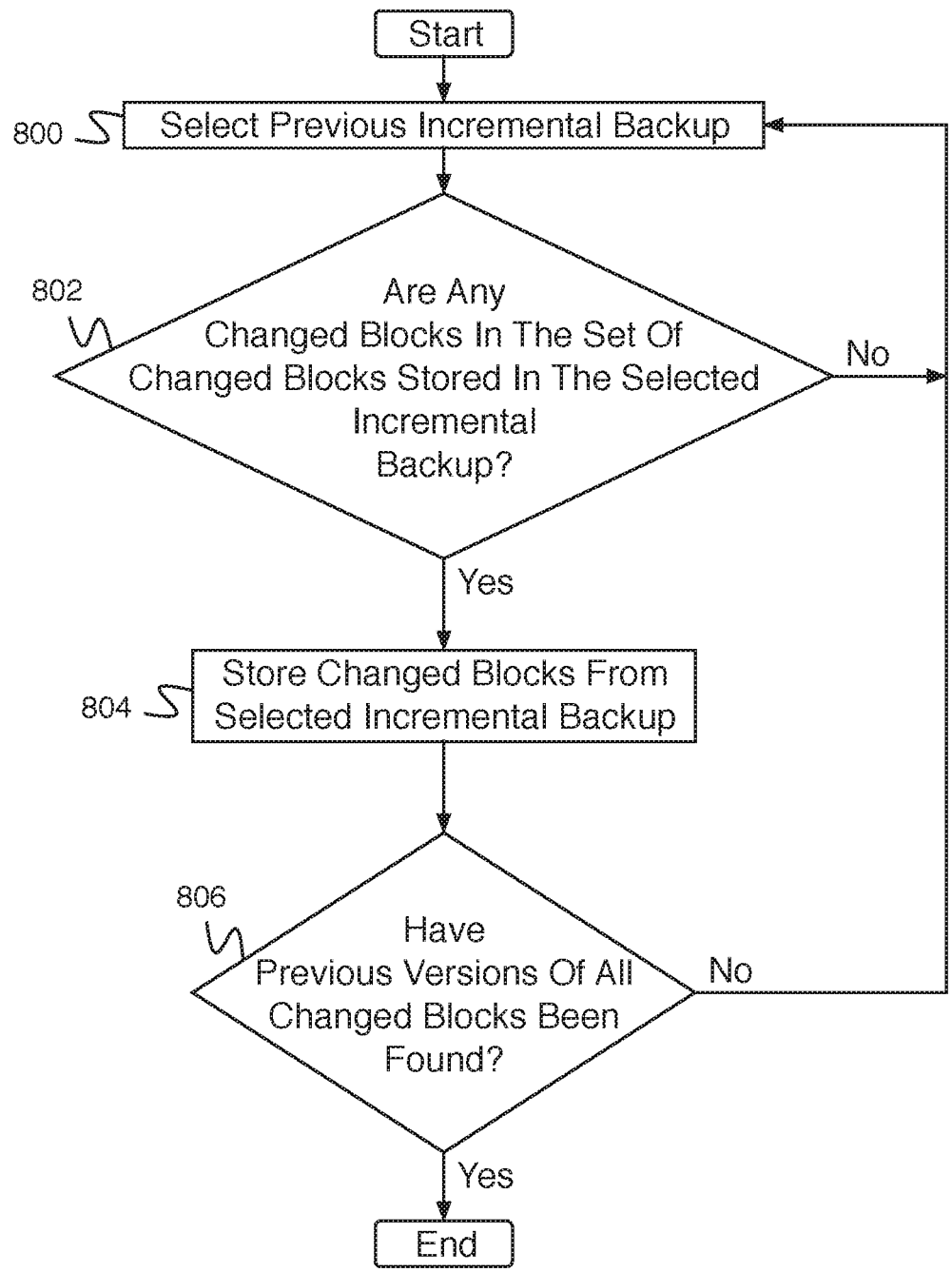
FIG. 8 is a flow diagram illustrating an embodiment of a process for determining previous versions of changed blocks.

FIG. 8 is a flow diagram illustrating an embodiment of a process for determining previous versions of changed blocks. In some embodiments, the process of FIG. 8 implements 722 of FIG. 7. In the example shown, in 800, the previous incremental backup is selected. In some embodiments, the previous incremental backup comprises the incremental backup made at the backup time. In 802, it is determined whether any changed blocks in the set of changed blocks are stored in the selected incremental backup. If it is determined that no changed blocks in the set of changed blocks are stored in the selected incremental backup, control passes to 800. If it is determined that there are changed blocks from the set of changed blocks stored in the selected incremental backup, control passes to 804. In 804, the changed blocks (e.g., the changed blocks from the set of changed blocks) from the selected incremental backup are stored. In 806, it is determined whether previous versions of all changed blocks have been found (e.g., whether all changed blocks from the set of changed blocks have been found in previous incremental backups). If it is determined that previous versions of all changed blocks have not been found, control passes to 800. If it is determined that previous versions of all changed blocks have been found, the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A backup system, comprising:
   a tape backup storage storing a set of tape backup data that includes a set of one or more incremental backups;
   a snapshot backup storage storing a nearest snapshot; and
   a processor configured to:
      determine that the nearest snapshot is after a backup time;
      determine, for an incremental backup that occurs before the nearest snapshot, one or more changed blocks and version information associated with the one or more changed blocks, wherein the one or more changed blocks are added to a set of changed blocks; and
      use the determined one or more change blocks and the determined nearest snapshot to recover the backup data to the version of the change block that occurs immediately before the backup time.

2. The backup system of claim 1, wherein the processor is configured to receive a request to recover backup data associated with a backup time.

3. The backup system of claim 1, wherein the snapshot backup storage stores online backups.

4. The backup system of claim 1, wherein the snapshot backup storage comprises a backup system with fast access.

5. The backup system of claim 1, wherein the snapshot backup storage comprises a disk based backup storage system.

6. The backup system of claim 1, wherein the snapshot backup storage comprises a random access memory based backup storage system.

7. The backup system of claim 1, wherein the snapshot backup storage comprises a deduplicated backup storage system.

8. The backup system of claim 1, further comprising an input interface configured to receive a request to recover the backup data associated with the backup time.

9. The backup system of claim 1, further comprises an output interface configured to provide the backup data.

10. The backup system of claim 1, wherein the processor is further configured to determine the backup data.

11. The backup system of claim 10, wherein the backup data is determined using the set of tape backup data and the nearest snapshot.

12. The backup system of claim 11, wherein a new snapshot corresponding to the back time is determined.

13. The backup system of claim 1, wherein the backup data is determined using previous incremental backups to the nearest snapshot and determining changed blocks to recover the backup data.

14. The backup system of claim 1, wherein the processor is configured to determine that the nearest snapshot is before the backup time in the event the nearest snapshot is before the backup time the backup data is determined using subsequent incremental backups to the nearest snapshot and determining changed blocks to recover the backup data.

15. The system of claim 1, wherein the backup system uses the tape backup storage to store the backup data more frequently than the backup system uses the snapshot backup storage to store the backup data.

16. A method for backup, comprising:
    determining, using a processor, that a nearest snapshot is after a backup time, wherein the nearest snapshot is stored on a snapshot backup storage;
    determining, for an incremental backup that occurs before the nearest snapshot, one or more changed blocks and version information associated with the one or more changed blocks, wherein the one or more changed blocks are added to a set of changed blocks; and
    using the determined one or more change blocks and the determined nearest snapshot to recover the backup data to the version of the change block that occurs immediately before the backup time.

17. The method of claim 16, further comprising receiving a request to recover backup data associated with a backup time.

18. The method of claim 16, wherein the snapshot backup storage stores online backups.

19. The method of claim 16, wherein the snapshot backup storage comprises a deduplicated backup storage system.

20. A computer program product for backup, the computer program product being embodied in a non-transitory computer readable storage medium and comprising computer instructions for:
    determining that a nearest snapshot is after a backup time, wherein the nearest snapshot is stored on a snapshot backup storage;
    determining, for an incremental backup that occurs before the nearest snapshot, one or more changed blocks and version information associated with the one or more changed blocks, wherein the one or more changed blocks are added to a set of changed blocks;
    using the determined one or more change blocks and the determined nearest snapshot to recover the backup data to the version of the change block that occurs immediately before the backup time.

* * * * *